(12) United States Patent
Schaut et al.

(10) Patent No.: US 6,848,278 B2
(45) Date of Patent: Feb. 1, 2005

(54) CIRCULAR KNITTING MACHINE AND PROTECTIVE DEVICE THEREFOR

(75) Inventors: Bernhard Schaut, Albstadt (DE); Dietmar Traenkle, Balingen (DE)

(73) Assignee: SIPRA Patententwicklungs- und Beteiligungsgesellschaft mbH, Albstadt (DE)

( * ) Notice: Subject to any disclaimer, the term of this patent is extended or adjusted under 35 U.S.C. 154(b) by 0 days.

(21) Appl. No.: 10/417,612

(22) Filed: Apr. 17, 2003

(65) Prior Publication Data

US 2003/0226379 A1 Dec. 11, 2003

(30) Foreign Application Priority Data

Apr. 22, 2002 (DE) .......................................... 102 18 221

(51) Int. Cl.[7] .............................................. D04B 9/00
(52) U.S. Cl. ............................................................ 66/8
(58) Field of Search ............................. 66/8, 147–157, 66/168, 1 A

(56) References Cited

U.S. PATENT DOCUMENTS 3,274,803 A * 9/1966 Schmidt ...................... 66/168
4,033,147 A 7/1977 King
4,718,253 A * 1/1988 Lonati ............................. 66/8
4,765,155 A * 8/1988 Pernick ........................... 66/8

FOREIGN PATENT DOCUMENTS

| DE | 1 585 177 | 10/1970 |
|---|---|---|
| DE | 199 24 217 A1 | 11/2000 |
| EP | 0 219 030 A2 | 4/1987 |
| EP | 0 301 658 A1 | 2/1989 |
| EP | 0 301 685 B1 | 7/1994 |

* cited by examiner

Primary Examiner—Danny Worrell
(74) Attorney, Agent, or Firm—Michael J. Striker

(57) ABSTRACT

The invention relates to a circular knitting machine with a protective cover (17) at least partially surrounding a take down and/or winding up device (15) on the outside. The cover (17) which includes a guide fixed on the machine frame and segments (18 to 23) movably mounted on this. In accordance with the invention the segments (18 to 23) are so arranged at different radial distances from a machine axis (11) that they are movable relative to one another at least partially with mutual overlapping.

14 Claims, 6 Drawing Sheets

CIRCULAR KNITTING MACHINE AND PROTECTIVE DEVICE THEREFOR

FIELD OF THE INVENTION

This invention relates to a circular knitting machine comprising: a frame including a plurality of feet and a support ring supported by the feet, means mounted on the frame for producing a hose knitwear, a device arranged below the support ring for taking down and/or winding up the knitwear and a protective cover at least partially surrounding the device on the outside and comprising a guide and segmetns movably mounted thereon, which segments can be moved between an open position enabling access to tile device and a closed position preventing access to the device.

DESCRIPTION OF THE PRIOR ART

In order to protect the operator it is necessary to provide rotating parts in circular Knitting machines, especially the take down and/or winding up device, with a protective cover. However the known protective covers cannot give complete satisfaction, since they do indeed protect the operator adequately from injury but at the same time they make access to the machine difficult. The protective cover would therefore have to be composed of elements, which can easily be mounted and dismounted and would involve much outlay and high costs.

In order that simple access at least to the take down and/or winding up device is possible when required, e.g. for easy removal of the finished fabric batch, such protective covers frequently have a door with at least one door segment which can be swung out radially about a vertical axis (U.S. Pat. No. 4,033,147). However this leads to the need to provide a comparatively large free space round the periphery of the circular knitting machine, to enable unimpeded opening of the swiavble door segment, especially when circular knitting machines with large diameters or circular knitting machines are involeved in which the hose knitwear is cut along a longitudinal side and spread out to a single layer fabric before the winding up. Apart from this a plurality of such doors or additional releasable segments have to be provided round the periphery of the circular knitting machine when access to the machine has to be possible also at places outside that provided for removing the fabric bale.

In one known circular knitting machine of the kind initially specified (DE 199 24 217 A1), instead of swivably mounted elements, two door segments extending over part of the periphery are provided and can be slid horizontally and in the peripheral direction on a guide fixed on the machine frame. It is true that no additional space for opening of door segments is then required; however it is unavoidable with such sliding doors that access to the circular knitting machine from sides other than that of the door opening is impeded.

Apart from this, the described protective covers in the closed state also impede access to the cam box segments, thread guides and other means used for the production of the knitwear. This is especially the case for smaller persons and circular knitting machines with large diameters and devices for spreading the knitwear out to a single layer web, since the protective cover usually comprises a lower, substantially cylindrical section and an adjoining upper section rising obliquely or conically to an upper support ring and is thus overall comparatively high and stands out a lot radially. This defect can be partially alleviated by circular knitting machines also already known (EP 0 301 685 B1) in which an upper section of the protective cover is made vertically slidable. The outlay in construction is however substantially increased by this, especially when the protective cover has to be provided all round both with swivable or horizontally slidable segments and also sections which are vertically movably mounted on these.

SUMMARY OF INVENTION

Starting from the above state of the art an object underlying the present invention is to provide or surround the circular knitting machine of the kind initially specified with a protective device which can be opened at different places.

A further object of the present invention is to provide a protective device for a circular knitting in such a manner that the protective device can when necessary be so designed that access from all sides is possible both to means producing a knitwear and to a take down and/or winding up device.

Yet another object of the present invention is to design the circular knitting machine of the kind specified above such that the protective device can be opened in a simple way and at a plurality of different spaces.

These and other objects of the present invention are solved in that the segments of the protective device are so arranged at different radial distances from a machine axis that they can be moved at least partially with mutual overlapping relative to one another.

A protective device according to the present invention for a circular knitting machine at least partially surrounds a taking down and/or winding up device of the machine on the outside and comprises a guide and segements movably mounted thereon. The segments can be moved between an open position enabling access to the device and a closed position preventing access to the device and are so arranged at different radial distances from a machine axis that said segments can be moved at least partially with mutual overlapping relative to one another.

Further advantageous features of the invention appear from the dependent claims.

BRIEF DESCRIPTION OF THE DRAWINGS

The invention will be explained in more detail below in conjunction with the accompanying drawings of an embodiment, in which.

DESCRIPTION OF A PREFERRED EMBODIMENT OF THE INVENTION

Figure 1:
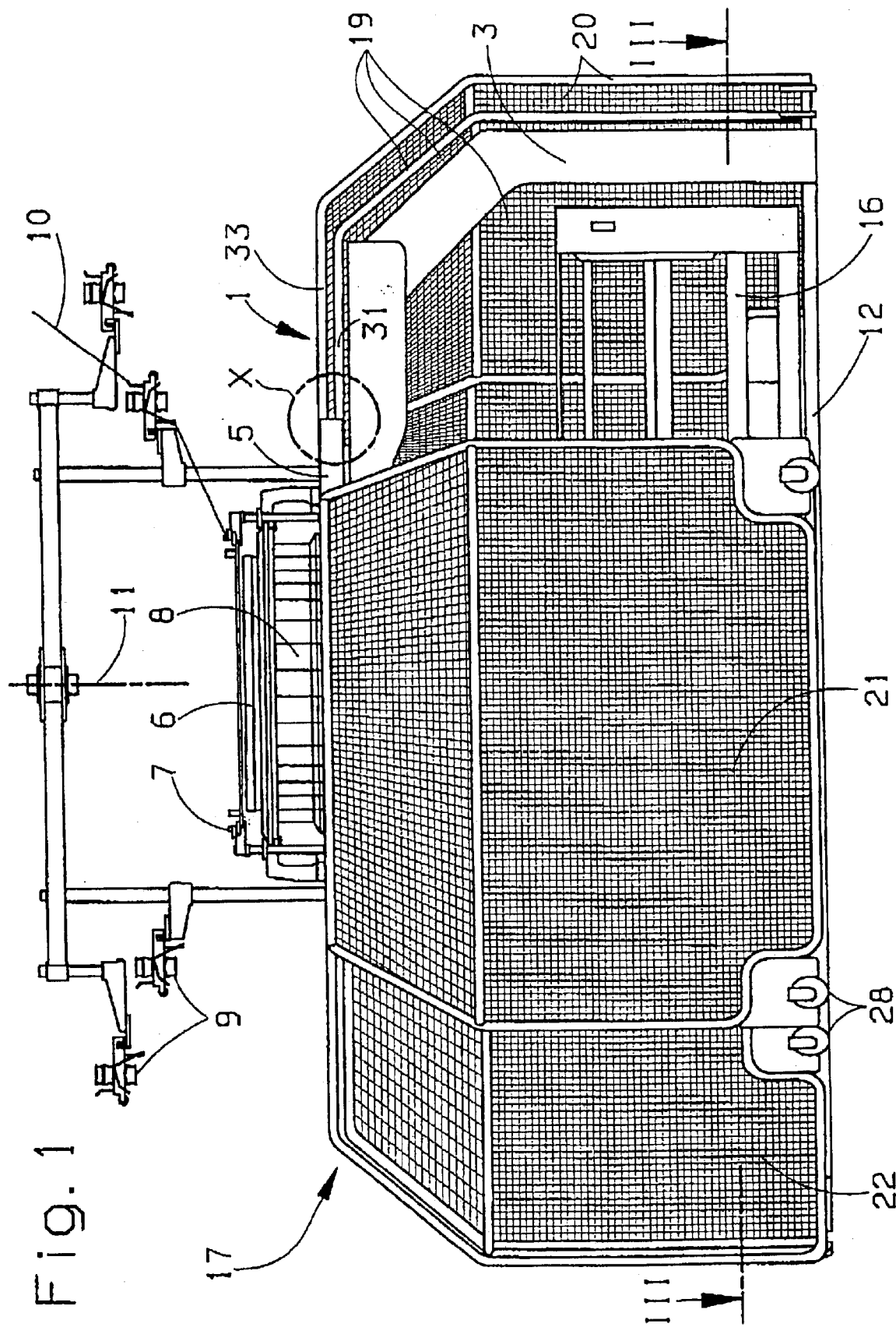
FIG. 1 is a schematic side view in the direction of the arrow x in FIG. 3 of a circular knitting machine according to the invention with a partially opened protective cover.
Figure 2:
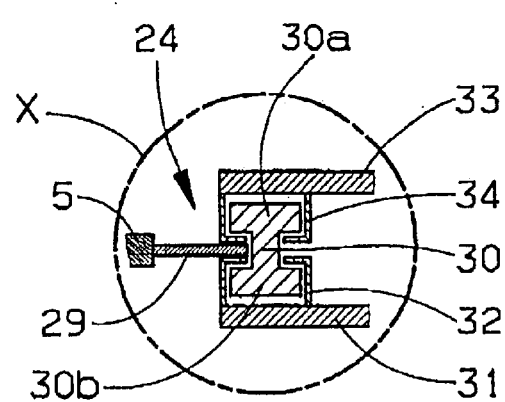
FIG. 2 shows an enlarged detail X of FIG. 1.
Figure 3:
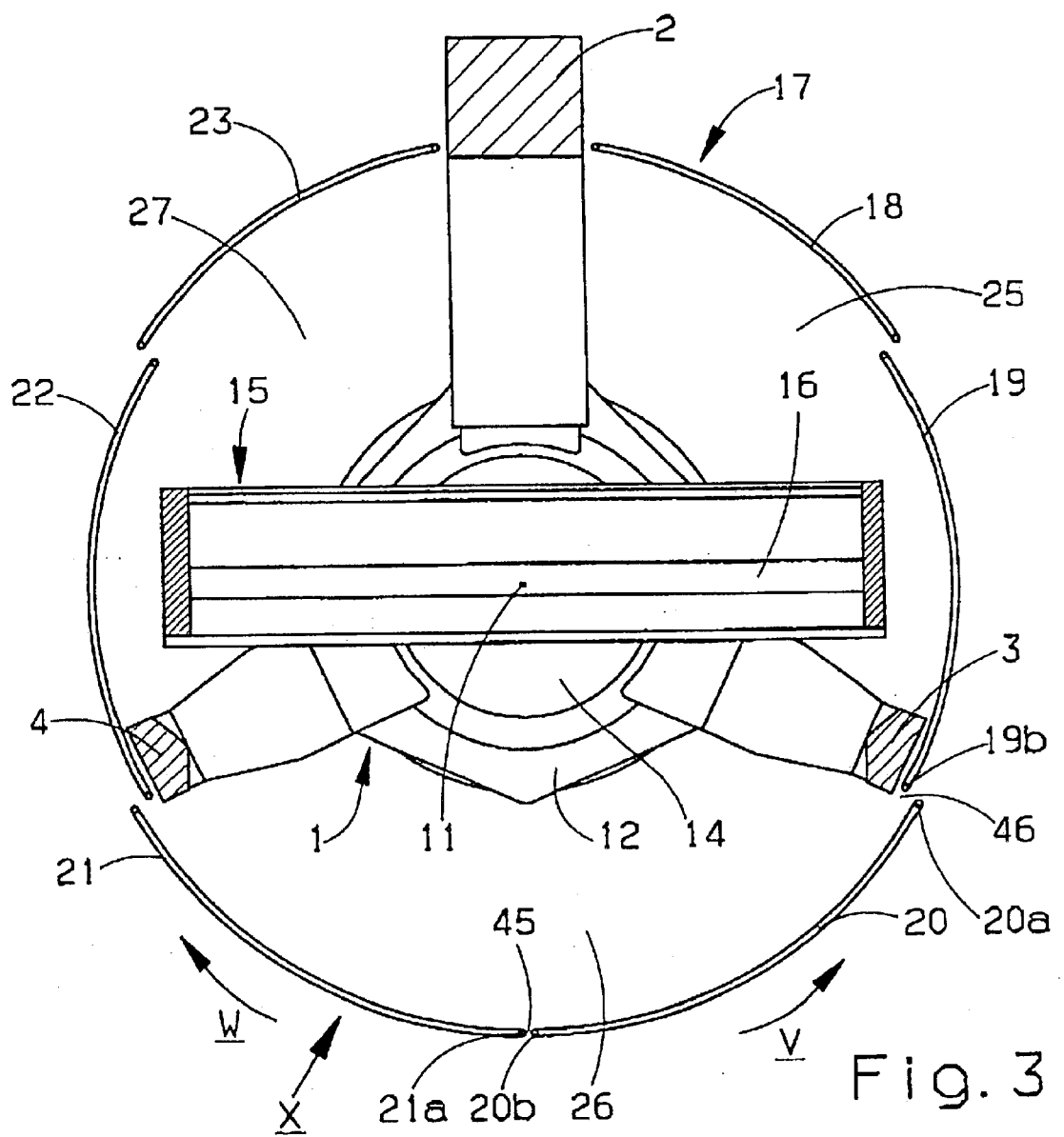
FIG. 3 is a schematic horizontal section through the circular knitting machine along the line III—III of FIG. 1 at the level of a winding up roller and in the closed state of the protective cover.

FIGS. 1 to 3 show a circular knitting machine schematically, with a frame 1 which has a plurality of feet 2, 3 and 4 (FIG. 3) on which a support ring 5 (FIGS. 1, 2) is carried. The support ring 5 serves for example for rotational mounting of a needle cylinder 6 and stationary mounting of a thread guide ring 7 provided with a plurality of thread guides, a cam box ring 8 surrounding the needle cylinder 6, a plurality of thread feed devices 9 for feeding threads 10 to the knitting needles fitted in the needle cylinder 6 and other components, which are denoted herein as a whole as means for producing hose knitwear.

The feet 3 and 4 are spaced angularly about 110° from the foot 2 in the embodiment while the angular spacing from one another of the feet 3, 4 amounts to about 140° and the feet are arranged a sufficient radial distance from a central machine axis 11 (FIG. 1) The foot 2 is a main foot, which serves to receive a drive motor, not shown in detail, or other electrical or electronic components as well as operating elements for the circular knitting machine, while the feet 3 and 4 are side feet, which apart from an optionally provided switch unit are free from such components.

Below the support ring 5 and in the region bounded by the feet 2, 3 and 4 the frame 1 comprises a lower support ring 12 (FIG. 3), in which a revolving plate 12 is mounted rotatably. A take down and/or winding up device generally denoted by the reference numeral 15 is mounted on the revolving plate 14, by means of which the knitwear can be taken down and wound up. In principle it is immaterial whether the knitwear is only taken down or only wound up or taken down and wound up by the device 15. The device 15 can, therefore, also be simply said to be a "knit-wear receiving device" or the like.

A winding up roller 16 of the device 15 is shown schematically in each of FIGS. 3 to 6 and the knitwear produced in the circular knitting machine is wound up on this. Accordingly the angular spacing between the two side feet 3, 4 is so selected at about 140° for example that the winding up roller 16 can, in the fully wound state, be withdrawn forwardly, for example in the relative position seen in FIG. 3 substantially in the direction of an arrow x, i.e. perpendicular to the axos of roller 16, between the side feet 3, 4, and replaced by a new winding up roller 16.

The circular knitting machine is further provided with a protective cover 17 (FIG. 1) which essentially extends from the support ring 5 down to the lower ends of the feet 2, 3 and 4 and covers the device 15 round its outer periphery, in order to avoid injuries to the operator by rotating parts during operation of the circular knitting machine. The protective cover includes, as is explained in more detail below, a plurality of segments 18 to 23, which are movably mounted on a guide 24 fixed to the frame 1 (FIG. 2).

Circular knitting machines of this kind are generally known to the man skilled in the art (e.g. EP 0 301 658 A2, DE 199 24 217 A1) and therefore do not need to be described in more detail.

In the embodiment of the invention shown schematically in FIGS. 3 to 6 and so far regarded as the best, the protective cover 17 comprises 6 segments 18 to 23. The two segments 18 and 19 are associated with a space 25 between the feet 2 and 3, the two segments 20 and 21 with a space 26 between the feet 3 and 4 and the two segments 22 and 23 with a space 27 between the two feet 4 and 2, in such a manner that these segments 18 to 23 completely cover the spaces 25 to 27 in question in a closed position seen in FIG. 3. Longitudinal edges at the sides (e.g. 19b, 20a or 20b, 21a) are preferably opposed, as FIG. 3 shows, so as to form such narrow vertical gaps 45, 46, that it is impossible inadvertently to insert a finger, foot or the like. Moreover the segments 18 to 23 are arranged at different radial distances from the machine axis 11 running perpendicular to the plane of the drawing and denoted by a dot in FIG. 3. In particular, the arrangement in the embodiment is such that, starting from the main foot 2 and as regarded in the clockwise sense, the first, third, fourth and sixth segments 18, 20, 21 and 23 have a greater radial distance from the machine axis 11 than the second and fifth segments 19, 22.

Figure 4:
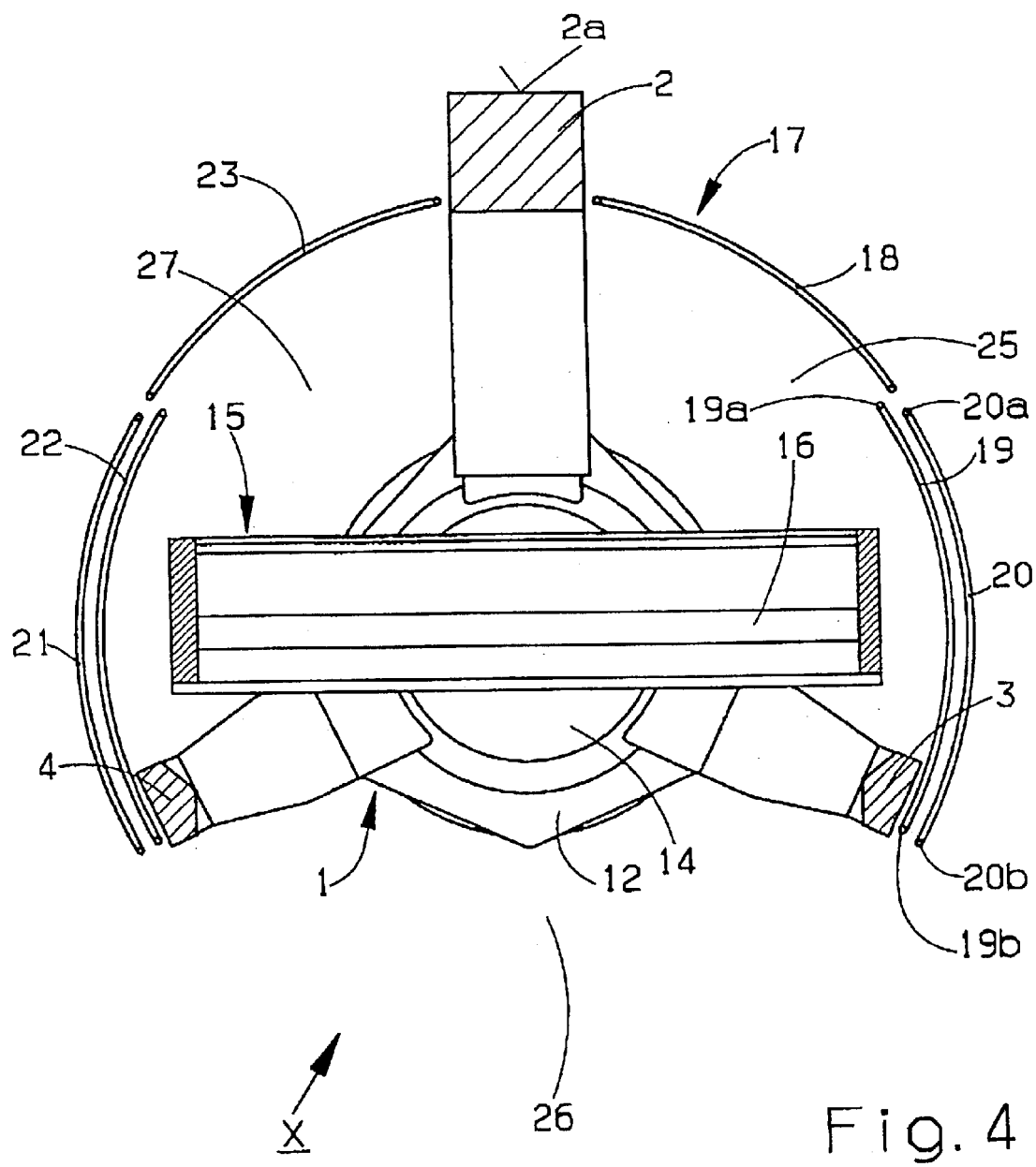
FIG. 4 is section corresponding to FIG. 3 but in an opened position of the protective cover for removal of a fabric bale.

The different radial distances of the segments 18 to 23 from the machine axis 11 are so selected that the segments 18 to 23 can be displaced relative to one another with at least partial mutual overlapping. By "mutual overlapping" is to be understood for example that the segment 20, starting from the closed position according to FIG. 3, can be moved in the peripheral direction (arrow v) and anticlockwise into an open position seen in FIG. 4, in which it is not alongside but is disposed directly in front of the segment 19, so that the longitudinal edges 19a, 19b and 20a, 20b of the two segments 19, 20 adjoin one another in substantially flush pairs. In this position the segment 20 therefore overlaps the segment 19 over its whole extent. In a corresponding manner the segment 22 in FIG. 4 is completely overlapped or covered on the outside by the segment 21 after displacement of the segment 21 clockwise, i.e. in the direction of an arrow w (FIG. 3).

Figure 5:
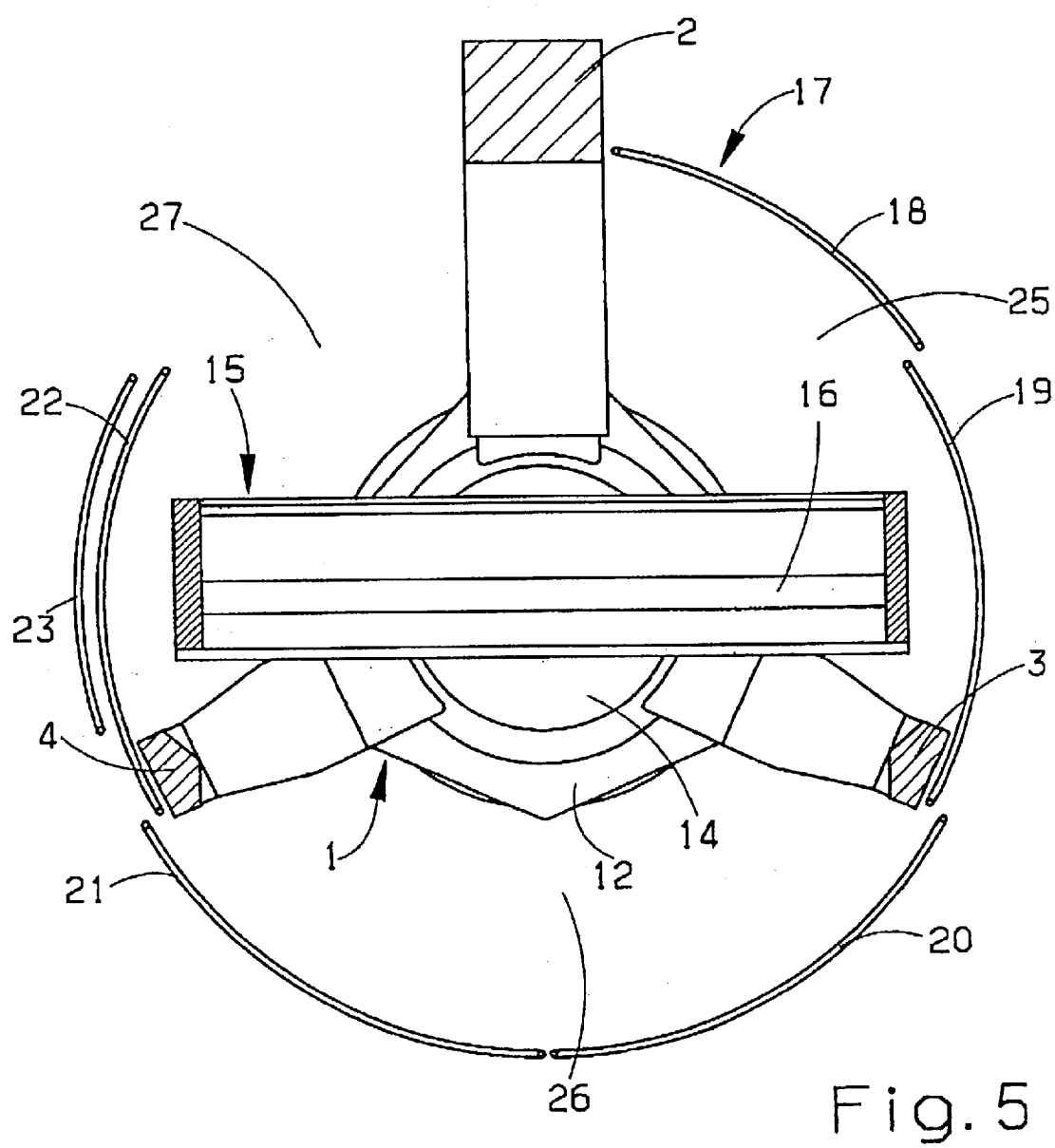
FIGS. 5 and 6 are sections corresponding to FIG. 3 but in two further possible open positions of the protective cover.
Figure 6:
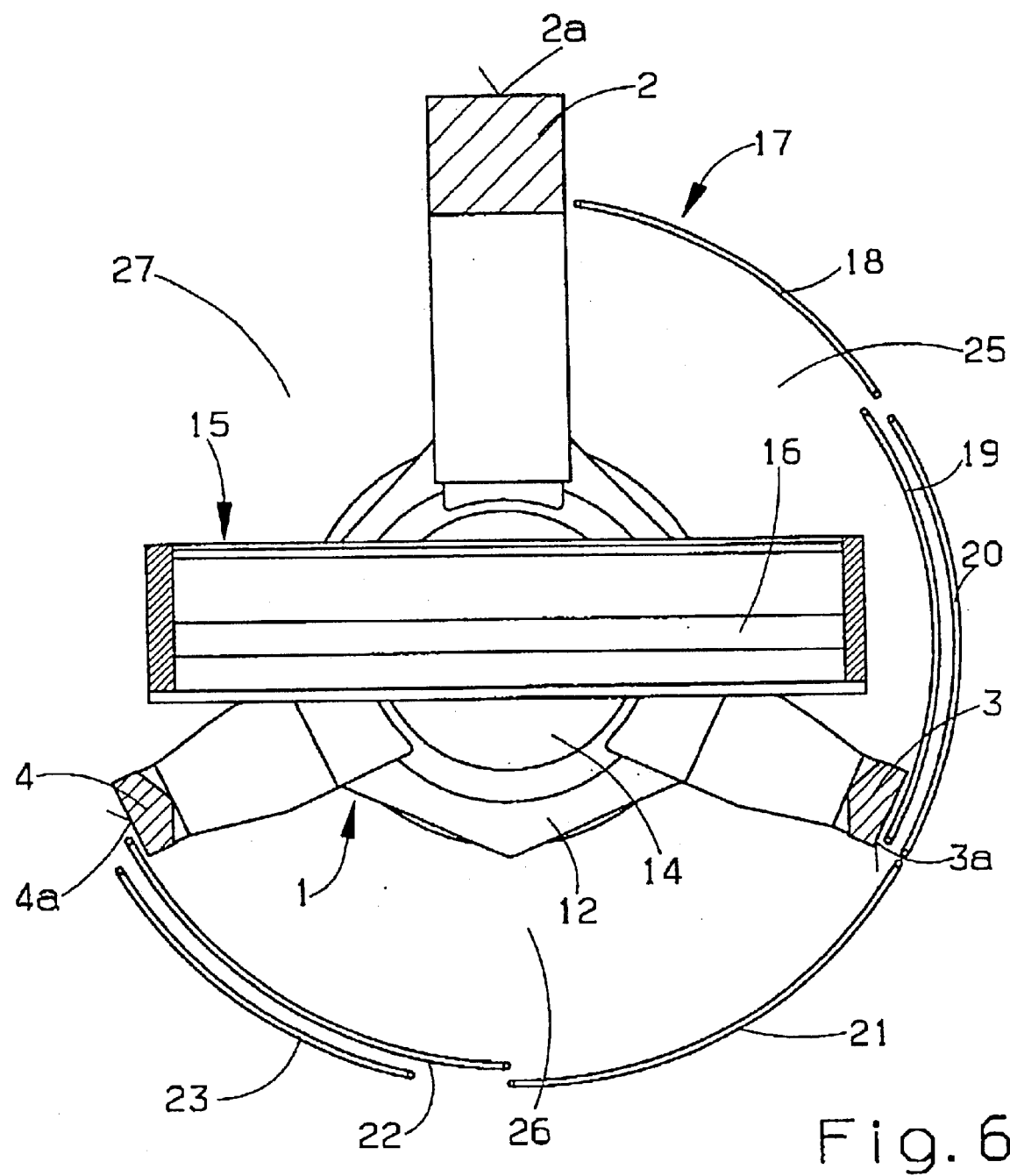

The arrangement according to the invention and ability to shift of the segments 18 to 23 with different spacings from the machine axis 11 makes it possible to open up or cover the spaces 25 to 27 entirely as desired. In the closed position according to FIG. 3 all three spaces 25 to 27 are hermetically closed. In FIG. 4 the space 26 is completely opened, so that the fabric batch wound on the winding up roller 16 can be removed forwards. FIG. 5 shows a position in which the space 27 is accessible over about half its width. This can be achieved if the segment 23 is shifted anticlockwise from the closed position according to FIG. 3, until it overlaps the adjacent segment 22 at least partially or, as shown in FIG. 5, completely. If it is desired to open up the space 27 over its whole width (FIG. 6), the segment 20 is firstly pushed over the segment 19 in accordance with FIG. 4. Then the segment 21 is moved in the anticlockwise sense, until it assumes that position which the segment 20 assumes in FIG. 3. The two segments 22 and 23 are then shifted in the anticlockwise sense, individually one after the other or even in part together, until they are in that position according to FIG. 6 which is shown in FIG. 3 for the segment 21. The space 25 can be wholly or partially opened up in analogous manner by shifting the segments 18 to 21.

A high degree of flexibility in opening up or closing the spaces 25 to 27 is thus achieved through the arrangement and design according to the invention of the segments 18 to 23 of the protective cover 17. Although the protective cover 17 extends right round the machine axis 11, any region of the spaces 25 to 27 located between the feet 2 to 4 can be made partially halfway or completely accessible, depending on requirements. It is possible through this for the operator to create the space necessary for work on the circular knitting machine over the whole periphery of the circular knitting machine, by simple shifting of one of the segments 18 to 23, in order to be able to get at the means necessary for the knitting, such as for example when it is necessary or desired to adjust cam box parts, for threading threads or the like. The free space can amount selectively to about a third or a sixth of the periphery for example.

As FIGS. 3 to 6 further shown, the arrangement in the embodiment is such that the radial spacings of all segments 18 to 23 from the machine axis 11 are greater than the radial spacings of the radial end surfaces 3a, 4a (FIG. 6) of the side feet 3, 4 are from the machine axis 11. It is thus possible to move the radially inner segments 19 and 22 in the peripheral direction past the side feet 3, 4. The inner segments are moved on a circular track whose radius is at least equal to a circumscribed circle defined by the end surfaces 3a, 4a. On the other hand it is not necessary in the arrangement shown in the embodiment to arrange the segments 18 to 23 with such large radial spacings that they can also be moved past the radially longer main foot 2, although this would be possible if necessary.

The ability of the segments 18 to 23 to move in the peripheral direction (arrows v and w in FIG. 3) is preferably implemented with the aid of the guide 24 seen in FIGS. 1 and 2. This is circular and coaxial with the machine axis 11 and is arranged at such a height that it engages the upper ends of the segments 18 to 23, while lower ends of the segments 18 to 23 are preferably supported on the floor by means of rotatable running rollers or wheels 28. To this end the guide 24, which for example directly adjoins the two side parts of the main foot 2 and terminates there, is fixed with the aid of support bars 29 radially arranged on the support ring 5.

According to FIGS. 1 and 2 the guide 24 includes a circularly arranged support 30 rung in the peripheral direction and fixed to the support bars 29. This is for example in the form of an I or double T support provided with upper and lower guide parts 30a, 30b each extending in the peripheral direction. The upper guide part 30a serves for mounting and guiding the radially outer segments 18, 20, 21 and 23, the lower guide part 30b correspondingly for mounting and guiding the radially inner segments 19 and 22. To this end the radially inner segments 19 and 22 are provided at their upper ends with arms 31 (FIG. 2) projecting radially inwards. The arms 31 comprise slide elements 32 which are of U-shaped form, are pushed on to the lower guide part 30b and embrace this like a clamp. Correspondingly, the radially outer segments 18, 20, 21 and 23 are provided at their upper ends with radially inwardly projecting arms 33, which come to lie above the arms 31 and also comprise U-shaped slide elements 34 which are pushed on to the upper guide part 30a and embrace this like a clamp. The arms 33 and other sections of the outer segments 19, 20, 21 and 23 are so formed that they lie above the arms 31 and other sections of the inner segments 19, 22 and can therefore run past these in the described displacement of the segments 18 to 23. Correspondingly the guide elements 32, 34 are so formed and arranged that they do not impede overlapped displacement of the segments 18 to 23. Alternatively it would naturally be possible to arrange the segments 18, 20, 21 and 22 radially inside and the segments 19, 22 radially outside, Moreover the running rollers 28 could be replaced by suitable guides.

Figure 7:
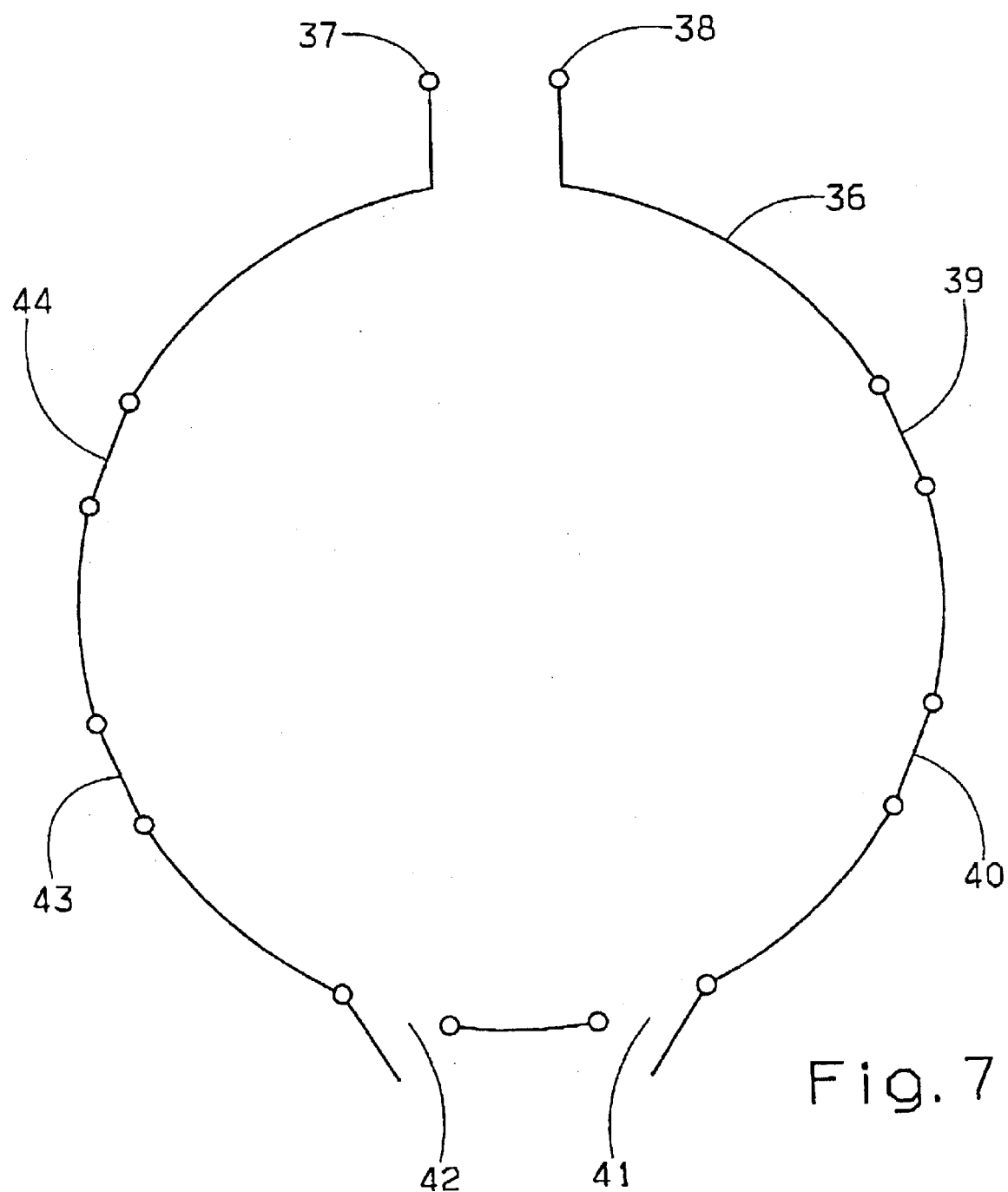
FIG. 7 shows an electric conductor schematically, with switches for interrupting the drive of the circular knitting machine with the protective cover opened.

FIG. 7 shows schematically an electrical conductor 36 designed for automatic control of the circular knitting machine, with two terminals 37 and 38. Six switches or contacts 38 to 44 are arranged in series circuit in the line 36 while each switch 39 to 44 is associated with one of the segments 18 to 23. The switches 39 to 44 are closed, so that current flow through the line 36 is possible, when all associated segments 18 to 23 are in their closed position according to FIG. 3. However, if one of the segments 18 to 23 is moved at least partially into an open position according to FIGS. 4 to 6, the switch 39 to 44 concerned is opened and current flow through the line 36 is not possible. The switch situation seen in FIG. 7 for example corresponds to the state of the protective cover 17 shown in FIG. 4. If the line 36 is for example a part of the supply line for the electric drive motor of the circular knitting machine, it is possible to ensure in a simple way that the drive motor can only be switched on when all segments 18 to 23 are in their closed position according to FIG. 3 The switches 39 to 44 can be in the form of mechanical limit switches, magnetic proximity switches or any other.

The invention is not restricted to the described embodiment, which can be modified in many ways. For example it would be possible, in order to cover or open up all or selected spaces 25 to 27 between the feet 2 to 4, to provide in each case only a single segment with a width corresponding to the width of the corresponding space. It would further be possible to give the segments 19 and 22 such a width in the peripheral direction that, in contrast to FIG. 3, they extend only up to the side feet 3, 4. However the overlapping shown in FIG. 3 offers the additional advantage that no awkward gaps occur between the segments and the side feet, which could be the cause of injuries in the regions accessible to the hands or feet. It is further clear that other advantageous guides could be provided in place of the guide 24 shown by way of example. In particular, in order to improve the sliding properties of the segments, it is possible to mount the slide elements 32, 34 with the aid of ball or roller bearings on the associated guide parts 30a, 30b. It would also be possible to arrange the segments at more than two different radial distances from the machine axis 11 and correspondingly to provide more than two associated guide parts. It would also be conceivable to associate each existing segment with its own guide, such that all segments can be shifted arbitrarily round the periphery of the circular knitting machine and not be limited by bumping into a segment sliding on the same guide part, but at most being restricted in their movement by bumping into the main foot 2. Moreover it is clear that the individual segments preferably have an arcuate shape in their lower sections corresponding to a peripheral circle on which they are moved, especially running along cylindrical surfaces, whereas in their upper sections they preferably run along conical surfaces. Alternatively the segments could be provided below the arms 31, 33 with largely vertical or obliquely extending flat sections, in which case the protective cover 17.would have a substantially polygonal cross-section. Furthermore the segments could be of different widths, as seen in the peripheral direction, such as is shown in FIG. 3 for the segments 19 to 22 which are wider as compared segments 18 and 23, especially when the angular spacings of the feet from one another are of different sizes, while of course also more than three feet can naturally be provided. Apart from this, it would be possible to move the individual segments on a circular track whose radius is at the most equal to the radius of an inscribed circle limited by the radially inner lying end surfaces of the feet, insofar as sufficient space is left for this between the feet and the take down and/or winding up device 15. Apart from this, solutions are also conceivable in this respect in which the guide 24 is not fixed or not solely fixed to the frame 1. This applies especially in cases in which a circular knitting machine is installed in a separate, narrowly confined space, which is provided for example with pillars, columns or the like enabling fitting the guide, or in which the segments 18 to 23 are formed as parts of a barrier grille surrounding the circular knitting machine. Finally it is obvious that the various features could also be used in other than the illustrated and described combinations.

It will be understood, that each of the elements described above, or two or more together, may also find a useful application in other types of constructions differing from the types described above.

While the invention has been illustrated and described as embodied in a circular knitting machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Circular knitting machine: a machine axis (11), a frame (1) having a plurality of feet (2, 3, 4) and a support ring (5) supported by said feet, means (6 to 9) mounted on said frame (1) for producing a hose knitwear, a device (15) arranged below said support ring (5) for taking down and/or winding up said knitwear and a protective cover (17) at least partially surrounding said device (15) on an outside, said cover (17) having a guide (24) at least partially surrounding said axis (11) and segments (18 to 23) mounted on said guide (24) for being movable thereon in a peripheral manner around said axis (11) and said device (15), said segments (18 to 23) being so arranged at different radial distances from said axis (11) that they can be moved at least partially with mutual overlapping relative to one another between an opposite position enabling access to said device (15) and a closed position preventing access to said device (15).

2. A protective device for at least partially surrounding a taking down and/or winding up device (15) of a circular machine from an outside and comprising: a substantially circular guide (24) at least partially surrounding an axis (11), and a plurality of segments (18 to 23) being mounted on said guide (24), said segments (18 to 23) being movable on said guide (24) in a peripheral manner around said axis (11) and so arranged at different radial distances from said axis (11) that they can be moved at least partially with mutual overlapping relative to one another between an open position enabling access to said device (15) and a closed position preventing access to said device (15).

3. Circular knitting machine according to claim 1, wherein spaces (25, 26, 2 7) located between each pair of said feet (2, 3, 4) can each be selectively covered and opened up by at least one of said movable segment (18 to 23).

4. Circular knitting machine according to claim 3, wherein said segments (18 to 23) are so formed and mounted on said guide (24) that they can be moved selectively in opposite directions for covering or opening up said spaces (25, 26, 27) located between said feet.

5. Circular knitting machine according to claim 1, wherein said guide (24) is so formed that said segments (18 to 23) are arranged with greater radial distances from a machine axis (11) than radial end surfaces (3a, 4a) of selected ones of said feet (3, 4).

6. Circular knitting machine according to claim 5, and further comprising a radially longer main foot (2) and two radially shorter side feet (3, 4), wherein said segments (18 to 23) are arranged at greater radial distances from the machine axis (11) than end surfaces (3a, 4a) of said side feet (3, 4) but a small radial distances than a radial end surface (2a) of said main foot (2).

7. Circular knitting machine according to claim 1, wherein said segments (18, 19; 20, 21; 22, 23) are each associated with said spaces (25, 26, 27) located between each two of said feet (2, 3, 4).

8. Circular knitting machine according to claim 1, wherein said segments (18 to 23) are support at upper ends on associated guide parts (30a, 30b) and at lower ends on running rollers (28).

9. Circular knitting machine according to claim 1, 5 or 8, wherein said guide (24) comprises an arcuate support (30) having a first guide part (30a) for mounting at least one radially outer segment (18 to 23) and a second guide part (30b) for mounting at least one radially inner segment.

10. Circular knitting machine according to claim 9, wherein said support (30) is fixed on said support ring (5).

11. Circular knitting machine according to claim 9, wherein said support ring (30) is fixed on the feet (2, 3, 4).

12. Circular knitting machine according to claim 9, wherein said segments (18 to 23) are supported by ball or roller bearings in said guide parts (30a, 30b), said bearings being chosen from a group including ball bearings and roller bearings.

13. Circular knitting machine according to claim 1, wherein said protective cover (17) is formed all round by movable segments (18 to 23).

14. Circular knitting machine according to claim 1, wherein said guide (24) is fixed on said frame (1).

* * * * *